(12) United States Patent  
Puchalska

(10) Patent No.: US 9,923,347 B2
(45) Date of Patent: Mar. 20, 2018

(54) ADJUSTABLE WIRE STRIPPER

(71) Applicant: Joanna Puchalska, Caledon (CA)

(72) Inventor: Joanna Puchalska, Caledon (CA)

( * ) Notice: Subject to any disclaimer, the term of this patent is extended or adjusted under 35 U.S.C. 154(b) by 265 days.

(21) Appl. No.: 14/938,845

(22) Filed: Nov. 12, 2015

(65) Prior Publication Data
US 2017/0141551 A1    May 18, 2017

(51) Int. Cl.
H02G 1/12    (2006.01)

(52) U.S. Cl.
CPC ........... *H02G 1/1217* (2013.01); *H02G 1/126* (2013.01)

(58) Field of Classification Search
CPC ...... H02G 1/1217; H02G 1/126; H02G 1/127; H01B 15/006
See application file for complete search history.

(56) References Cited

U.S. PATENT DOCUMENTS

| 4,356,630 | A | * | 11/1982 | David | H02G 1/1217 30/90.4 |
| 6,018,873 | A | * | 2/2000 | McClellan | H01B 15/006 30/90.1 |
| 7,040,020 | B2 | * | 5/2006 | Malet | H02G 1/1217 30/90.1 |
| 2013/0133203 | A1 | * | 5/2013 | Stocklein | H02G 1/1217 30/90.4 |
| 2013/0133204 | A1 | * | 5/2013 | McDannell | H02G 1/1217 30/90.8 |

* cited by examiner

Primary Examiner — David B Thomas

(57) ABSTRACT

This invention relates to a wire stripper device which may be hand held or placed on a bench vice to remove insulation from copper wires. The rectangular device has various sized holes within the body. Each of these holes has a perpendicular hole within it which houses and aligns a cutter. The cutter comes through the perpendicular hole far enough so that the sharp edge of the cutter cuts a slit in the insulation when the wire is being pulled through the various sized hole in the body. The cutters are held in place by adjustable screws which are housed in parallel holes above the various sized holes. Each cutter cuts a slit in the insulation of the wire so that the copper may be easily removed from the insulation once pulled through the hole.

4 Claims, 3 Drawing Sheets

ADJUSTABLE WIRE STRIPPER

BACKGROUND OF THE INVENTION

The invention relates to a hand-held wire stripping device, used for stripping insulation from wires. Generally these insulated wires contain copper wire which may be recycled. There are many devices and methods which have been designed for the purpose of stripping the insulation from copper wires.

Knives are often used for stripping copper wire as a cost-effective method for stripping the wires. Knives provide an unsafe method of stripping wires because the knife may slip and the user may cut their finger or hand. Usually a user will clamp one end of the wire to a bench vice and then take a knife and peel the insulation towards themselves.

There are also hand-held tools, which have an appearance of pliers or clippers, used in which one hand grips the tool so that it closes and cuts the insulation of the wire at a point of where they grip the wire and then the other hand is used to pull the wire through so that the insulation is slid off the wire and removed. The insulation is removed in a method where the user has already cut the insulation at a specific point on the wire, once the wire is pulled through the pliers the insulation is also pulled in the opposite direction. The difficulty with these devices is that the users hand will generally get sore because of the large amount of pressure required to hold the device closed with one hand and pull the wire with the other hand.

Described herein is a wire stripping hand-held device which is used to remove insulation from electrical wire or any wire generally consisting of copper within the insulation. This device has the benefit of simplicity to operate. There are costly devices available for the purpose of removing insulation from wire which may be too expensive for low volume recyclers to purchase. This device offers a low cost method of stripping insulation from electrical wires for users who do not have the funds or the volume to purchase expensive equipment to enable the users to recycle copper wire.

Although any wire stripping activities have an element of risk to bodily harm associated with them, this invention greatly reduces the level of risk due to its design. The invention reduces the amount of risk to bodily harm when using it because the holes are small enough so that an average sized adult finger should not be able to fit through the holes. This device is small and light-weight allowing users to easily store in one's pocket. The device is a cost-effective way for individuals and businesses to recycle copper wire.

BRIEF SUMMARY OF THE INVENTION

The invention is an adjustable wire stripper tool. The rectangular body of the tool houses horizontally aligned holes which hold cutters which split the insulation from insulated wire while wire is pulled through a set of horizontally aligned holes just below the holes which house the cutters. This adjustable wire stripper tool provides a safer and quicker alternative to stripping insulation from wire than the conventional method of using a knife. It also provides a cost effective alternative to various expensive wire stripping devices currently on the market.

BRIEF DESCRIPTION OF THE DRAWINGS

The invention can be better understood with reference to the following drawings. The components in the drawing are not necessarily to scale, emphasis instead being placed upon clearly illustrating the principles of the present invention.

DETAILED DESCRIPTION OF THE INVENTION

The below description of the invention should be used in conjunction with the drawings accompanying this document.

Figure 3:
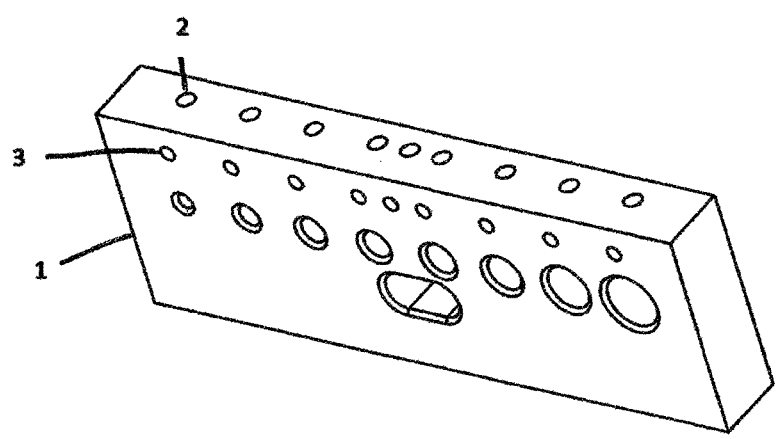
FIG. 3 shows a three dimensional view of the body of the adjustable wire stripper.

There are 3 main components of the device. The first component is the body as shown in FIG. 3. The second component are the cutters as shown in FIG. 5. The third component are the adjustable screws used to hold the cutters in place. A drawing of the screw is included in FIG. 4. Each main component may be manufactured using metal or aluminum.

Figure 1:
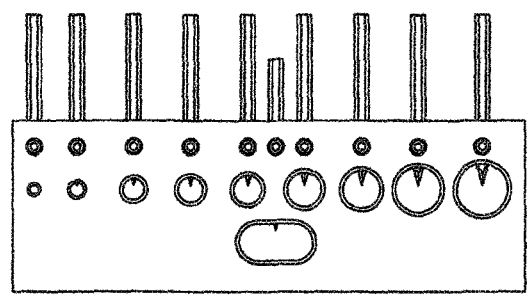
FIG. 1 is a front view of the assembled adjustable wire stripper.
Figure 2:
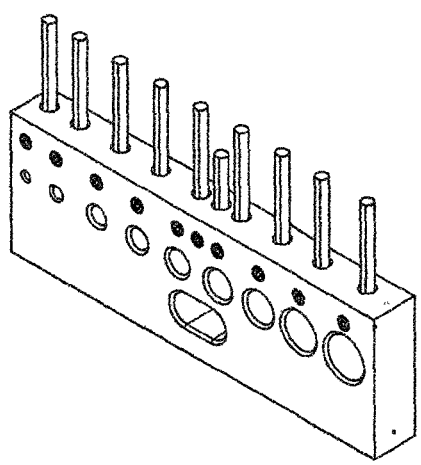
FIG. 2 is a three dimensional view of the assembled adjustable wire stripper.

The first component consists of the body. This is the main component of this device as shown in FIG. 3. The body has various sizes of holes to accommodate for various wire sizes as shown in FIGS. 3-1. These holes have perpendicular holes within them as shown in FIG. 3-2 which allow the cutters to come through the various sized holes to an adjustable depth through the respective various sized hole. The body also contains holes which are parallel to the respective various sized hole to hold the screws in place as shown in FIG. 3-3. These screws hold the cutters in place. This body may be hand-held or placed on a bench vice during the stripping process.

The second component consists of FIG. 5 which shows the cutter in a three-dimensional view. The method in which the cutters are sharpened simplifies for the user which way the cutters should be placed within the body. The sharp forward edge of each cutter, as shown in FIG. 5, is placed downward in the body, facing the user. Screws are then used to keep the cutters in place. If the insulation is thin then the cutters may be adjusted higher so that the cutters are not cutting into the copper inside the insulation. If the insulation is thicker then the cutters may be adjusted lower so that they cut enough of the insulation so that the insulation may be peeled easily once it has been fed and pulled through the hole. The cutters will create a slit on the insulation allowing the user to peel the insulation easily.

Figure 4:
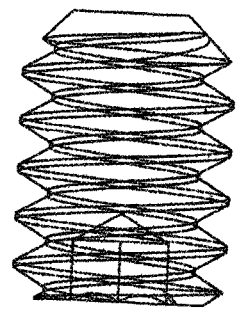
FIG. 4 shows the screw which retains the cutter in position under pressure in a three dimensional view.
Figure 5:
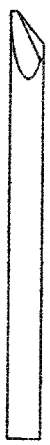
FIG. 5 shows the cutter in a three dimensional view.

The third component consists of the screws as shown in FIG. 4. These screws which hold the cutters in place are adjustable so that the user may unscrew the screw to move the cutter up or down if required to adjust for a wire size. Sometimes a wire size will be too large for one hole but too small for the next smallest hole so the user may use the larger hole but may need to adjust the cutter up or down so that the full thickness of the insulation is cut. The insulation should come off easily with no pressure required more than a hand movement of pulling the wire to one side and pulling the insulation to the other side. Once the cutters become dull from usage they may be re-sharpened by the user, if the user has proper equipment, or taken to a local company with proper equipment for sharpening.

Assembling the device is simple. FIG. 1 shows the assembled device. The user places one cutter in each hole, FIG. 3-2, which is perpendicular to the respective various sized hole, FIG. 3-1. The user then places each screw in the hole, FIG. 3-3, which is parallel to the various sized hole and tightens the screw to hold the cutter in place. FIG. 1 shows the front view of the assembled device with the cutters adjusted to a general depth which may be seen coming through the various sized holes.

There is a four step process to operating this device. The first step is to select a various sized hole which best matches the insulated wire size of the insulated wire to be stripped. The second step involves feeding the wire through the various sized hole on the device until there is enough wire on the back side of the device so that the user may grab the wire from the back side with their fingers or with a set of pliers. The third step is to pull the entire length of wire through the hole. The fourth step is to remove the insulation from the wire.

The adjustable wire stripper is cost-effective to manufacture and is light weight which makes it cost-effective to ship worldwide. This tool is designed to help individual recyclers and businesses to recycle copper wire.

The invention claimed is:

1. A wire stripper consisting of a body containing various sized holes which each contain perpendicular holes which align a plurality of adjustable cutters perpendicular to the various sized holes, wherein the adjustable cutters are held in place by screws being housed above the various sized holes in holes which are parallel to the various sized holes, such that the adjustable cutters produce a slit in the insulation when the insulated wire is pulled through a various sized hole of the body.

2. A wire stripper of claim 1 wherein said perpendicular holes house said adjustable cutters which said adjustable cutters come through said perpendicular holes of the body deep enough into said various sized holes for a slit to be produced on the insulation when the insulated wire is pulled through said various sized hole.

3. A wire stripper of claim 1 wherein said parallel holes house said screws wherein said screws hold said adjustable cutters in place.

4. A wire stripper of claim 1 comprising of various sized holes (either round or oval in shape) each including a said perpendicular hole wherein said cutter is aligned and able to be inserted, extracted and adjusted for depth into said various sized hole.

\* \* \* \* \*